United States Patent [19]

Kawaguchi

[11] Patent Number: 5,265,963
[45] Date of Patent: Nov. 30, 1993

[54] SIDE COVER FIXING STRUCTURE FOR LINEAR MOTION BEARING

[75] Inventor: Takahiro Kawaguchi, Tokyo, Japan

[73] Assignee: Thk Co., Ltd., Tokyo, Japan

[21] Appl. No.: 961,708

[22] PCT Filed: May 12, 1992

[86] PCT No.: PCT/JP92/00602

§ 371 Date: Mar. 11, 1993

§ 102(e) Date: Mar. 11, 1993

[87] PCT Pub. No.: WO92/20930

PCT Pub. Date: Nov. 26, 1992

[30] Foreign Application Priority Data

May 13, 1991 [JP] Japan .................. 3-42343[U]

[51] Int. Cl.⁵ .................................... F16C 29/04
[52] U.S. Cl. .................................. 384/43; 384/45
[58] Field of Search ................... 384/43, 44, 45, 49

[56] References Cited

U.S. PATENT DOCUMENTS

| | | | |
|---|---|---|---|
| 4,637,739 | 1/1987 | Hattori | 384/45 |
| 4,674,893 | 6/1987 | Teramachi | 384/45 |
| 5,087,130 | 2/1992 | Tsukada | 384/45 X |
| 5,102,235 | 4/1992 | Mugglestone | 384/45 |

FOREIGN PATENT DOCUMENTS

| | | |
|---|---|---|
| 51-131542 | 4/1950 | Japan . |
| 55-72912 | 6/1980 | Japan . |
| 58-48778 | 10/1983 | Japan . |
| 58-153717 | 10/1983 | Japan . |

*Primary Examiner*—Thomas R. Hannon
*Attorney, Agent, or Firm*—Armstrong, Westerman, Hattori, McLeland & Naughton

[57] ABSTRACT

A structure is provided for a linear motion bearing to be widely used as an industrial machine element and especially for a small-sized linear motion bearing, to fix side covers simply and inexpensively on the bearing body. Each of paired side covers 30 and 30 to be fixed in abutment on the two end faces of the bearing body 20 is formed with at least two retaining portions 31 and 31, and at least two connecting plates 60 and 60 to be bridged over the paired side covers 30 and 30 across the bearing body 10 are formed with hook portions 61 to be retained by the retaining portions 31 of the side covers 30, whereby the bearing body 20 and the paired side covers 30 and 30 are integrally fixed by retaining the hook portions 61 of the two ends of the connecting plates 60 in the corresponding retaining portions 31 of the individual side covers 30.

4 Claims, 5 Drawing Sheets

SIDE COVER FIXING STRUCTURE FOR LINEAR MOTION BEARING

TECHNICAL FIELD

The present invention relates to a side cover fixing structure in a linear motion bearing for fixing side covers on the bearing body.

BACKGROUND ART

The linear motion bearing is widely used as industrial machine elements such as a table saddle for a machine tool, a slide face of a machining center or a carriage of a conveyor.

The linear motion bearing of the prior art is constructed, as shown in FIG. 6, to include: a track bed 10; a bearing body 20 of a metal placed on the track bed 10; a pair of side covers 30 and 30 of a synthetic resin fixed in abutment on the two end faces of the bearing body 20; a number of balls 40 interposed between the bearing body 20 and the track bed 10; and a not-shown retainer for preventing the balls 40 from coming out when the bearing body 20 is removed from the track bed 10.

In the linear motion bearing thus constructed, the side covers 30 are fixed by using screws 80 on the two end faces of the bearing body 20. Specifically, the side covers 30 of synthetic resin are formed with through holes 35 in their predetermined positions. Moreover, the metallic bearing body 20 is formed with tapped holes 25 in its corresponding positions. The screws are extended through the through holes 35 of the side covers 30 and fastened in the tapped holes 25 of the bearing body 20.

In recent years, the linear motion bearing described above is used in OA equipment or electric appliances, too. In these examples of use, the linear motion bearing is generally small-sized and compact.

The tapping operations of the holes 25 in the bearing body 20 becomes the more difficult together with the screw fastening operations as the linear motion bearing has the smaller size.

An object of the present invention is to solve the aforementioned problems of the prior art and to provide a side cover fixing structure capable of fixing the side covers simply and inexpensively on the body of a small-sized linear motion bearing.

DISCLOSURE OF THE INVENTION

According to the present invention, there is provided a side cover fixing structure for a linear motion bearing, which structure comprises: a bearing body; a pair of side covers to be fixed in abutment on the two end faces of said bearing body and each having at least two retaining portions; and at least two connecting plates of an elastic member each having at its two ends hook portions to be retained by the retaining portions of said side covers, whereby said connecting plates fix said bearing body and said paired side covers integrally by having their two end hook portions retained by the corresponding retaining portions of said side covers.

In this technical means, the paired side covers are arranged in abutment against the two end faces of the bearing body. Each side cover is equipped with retaining portions in at least two portions, e.g., at the two side portions. Moreover, the connecting plates made of an elastic member have their two end hook portions so fitted on the retaining portions of the paired side covers as to cross the bearing body. As a result, the paired side covers are fixed on the two end faces of the bearing body by using at least two connecting plates.

DESIGNATIONS OF REFERENCE NUMERALS

10 . . . Track Bed; 20 . . . Bearing Body; 30 . . . Side Covers; 31 . . . Retaining Portions; 32 . . . Slopes; 33 . . . Recesses; 40 . . . Balls; 60 . . . Connecting Plates; 61 . . . Hook Portions; 62 . . . Recesses; and 63 . . . Flat Faces.

BEST MODE FOR CARRYING OUT THE INVENTION

A side cover fixing structure of a linear motion bearing according to the present invention will be described in detail in the following with reference to the accompanying drawings.

Figure 1:
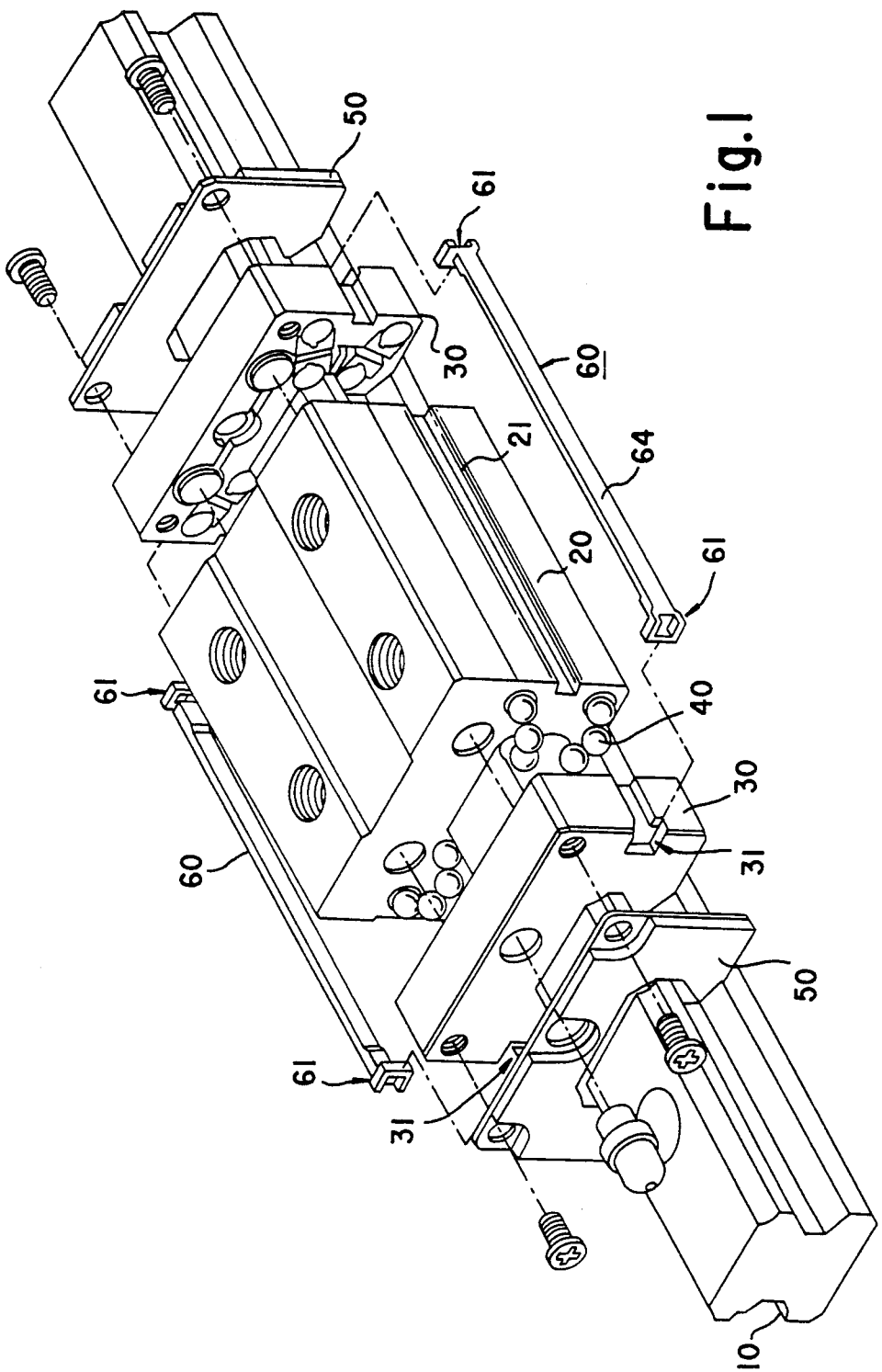
FIG. 1 is an exploded perspective view showing one embodiment of a linear motion bearing having a side cover fixing structure according to the present invention.
Figure 2:
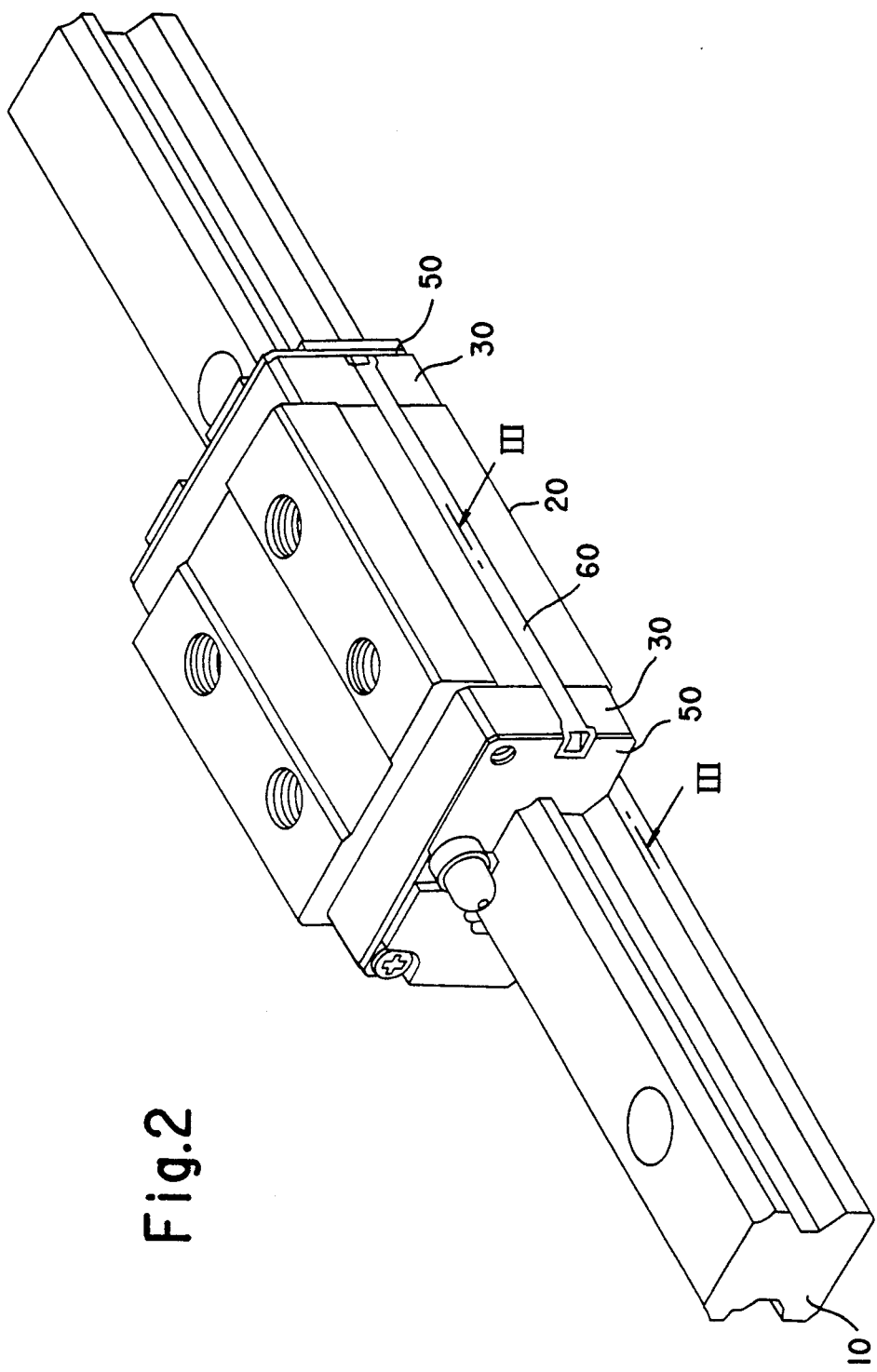
FIG. 2 is a perspective view showing the side cover fixing structure of FIG. 1 when the same is assembled.

With reference to FIGS. 1 and 2, there is shown one embodiment of the side cover fixing structure of the linear motion bearing according to the present invention.

Figure 6:
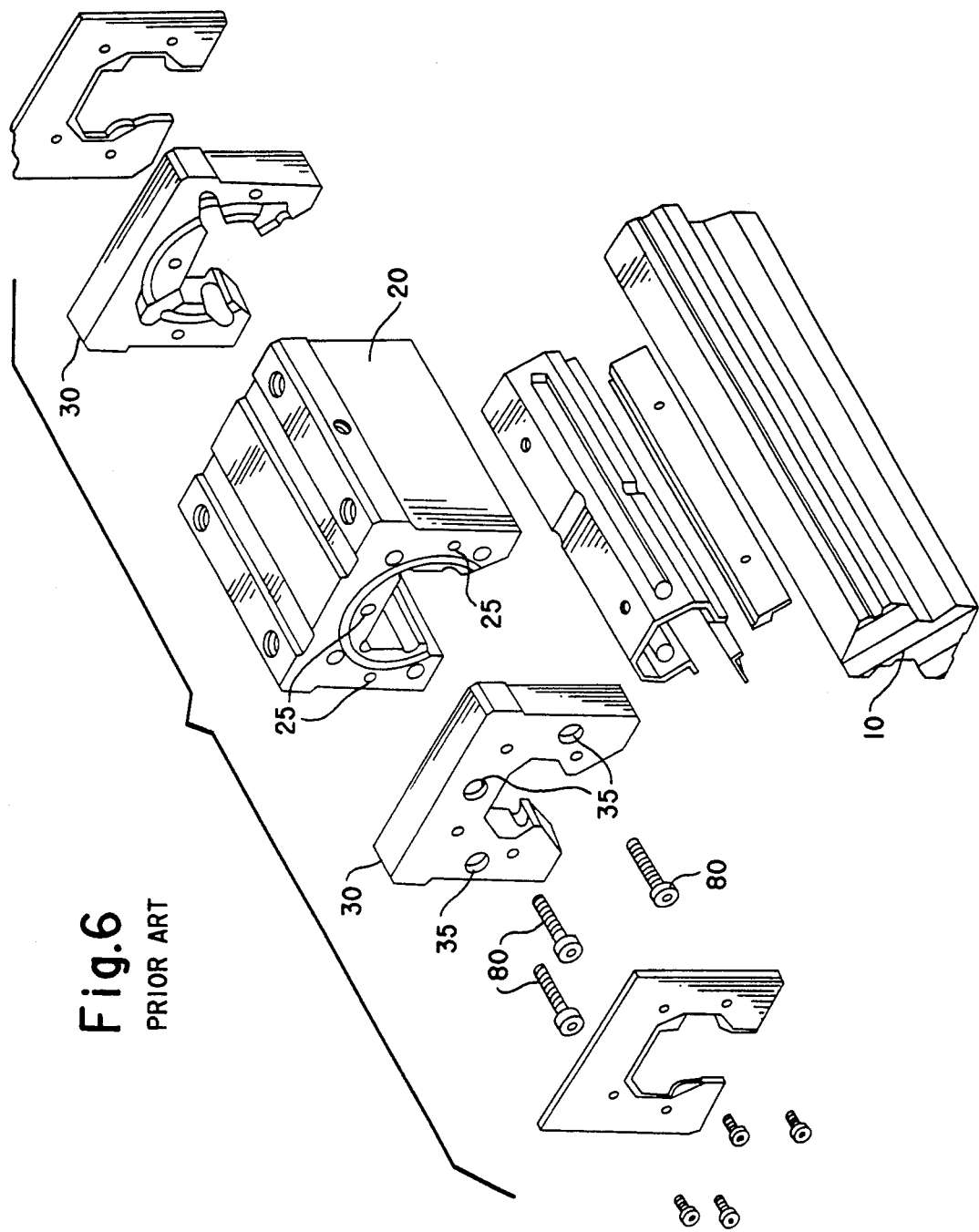
FIG. 6 is a perspective view showing the side cover fixing structure of the linear motion bearing of the prior art.

The linear motion bearing, as shown, is basically constructed of components similar to those of the linear motion bearing of the prior art shown in FIG. 6. Specifically, the linear motion bearing is constructed to include: a track bed 10; a bearing body 20 of a metal placed on the track bed; a pair of side covers 30 of die cast metal or synthetic resin fixed in abutment on the two end faces of the bearing body 20; a multiplicity of balls 40 interposed between the bearing body 20 and the track bed 10; and sealed retainer holders 50 for preventing any invasion of foreign substances. These are components well known in the art, and their detailed description will be omitted. p
The present invention is characterized in that the paired side covers 30 and 30 are fixed in abutment on the two end faces of the bearing body 20.

Figure 3:
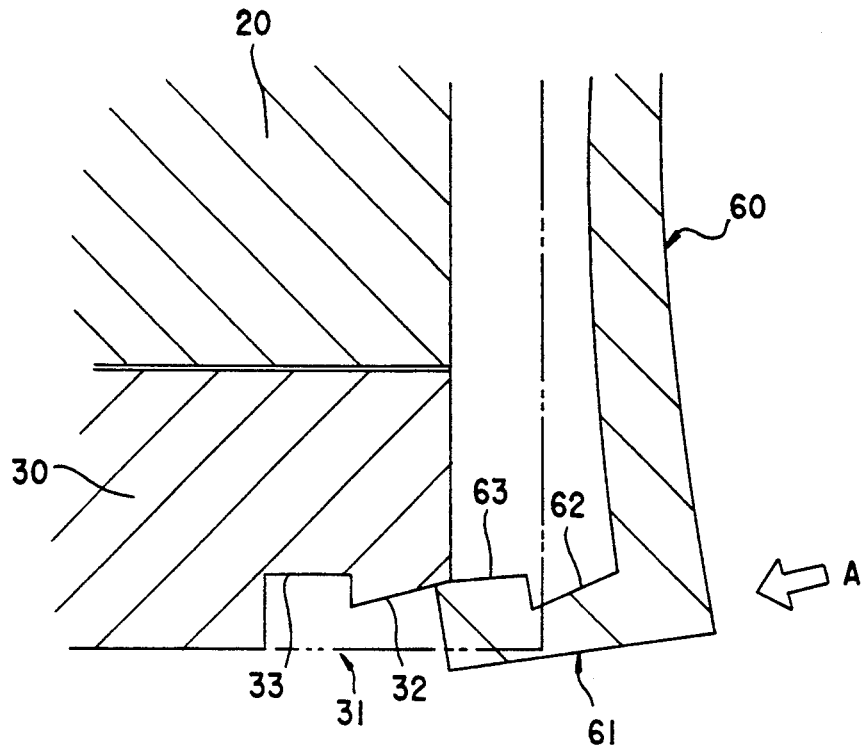
FIG. 3 is a section showing a portion of the side cover fixing structure of FIG. 1 and taken along line III—III.

In the embodiment of FIGS. 1 and 2, each side cover 30 is formed at its two end portions with retaining portions 31. Each of these retaining portions 31 is formed of a slope 32 and a deeper recess 33, as shown in FIG. 3.

The side cover fixing structure according to the present invention further includes two connecting plates 60 and 60 made of an elastic member such as synthetic resin. Each of these connecting plates 60 is formed at its two ends with a hook portion 61 to be retained by the retaining portion 31 of the side cover 30. As shown in FIG. 3, the hook portion 61 is formed of a recess 62 and a flat face 63, which mate with the slope 32 and the recess 33 of the retaining portion 31, respectively. The recess 62 may preferably have its bottom face inclined at such an angle that it contacts in a face-to-face relation with the slope 32 of the retaining portion 31. As a result, the side covers 30 and 30 are firmly fixed on the two end faces of the bearing body 20.

Since the side cover 30 is formed with the slopes 32, as described above, the hook portions 61 of the connecting plates 60 are opened, as shown, if pushed from the side faces of the linear motion bearing, until they fitted on the retaining portions 31 formed on the two side portions of the side covers 30. As a result, the hook portions 61 of the connecting plates 60 can be prevented from coming out of the retaining portions 31 of the side covers 30.

Incidentally, the metallic bearing body 20 may preferably be formed, as in the shown embodiment, with grooves 21 for accommodating the step portions 64 of the connecting plates. Generally speaking, the bearing body 20 is manufactured by the cold drawing process so that the formation of the grooves 21 extending in the axial direction of the bearing body 20 will not lead to a rise in the production cost. Since the connecting plates 60 are fitted as a whole in the side faces of the bearing body 20, there are obtained advantages that the connecting plates 60 can be prevented from coming out even with the possible contacts with foreign substances and that the bearing body 20 can have its side faces retaining their roles as reference faces.

Figure 4:
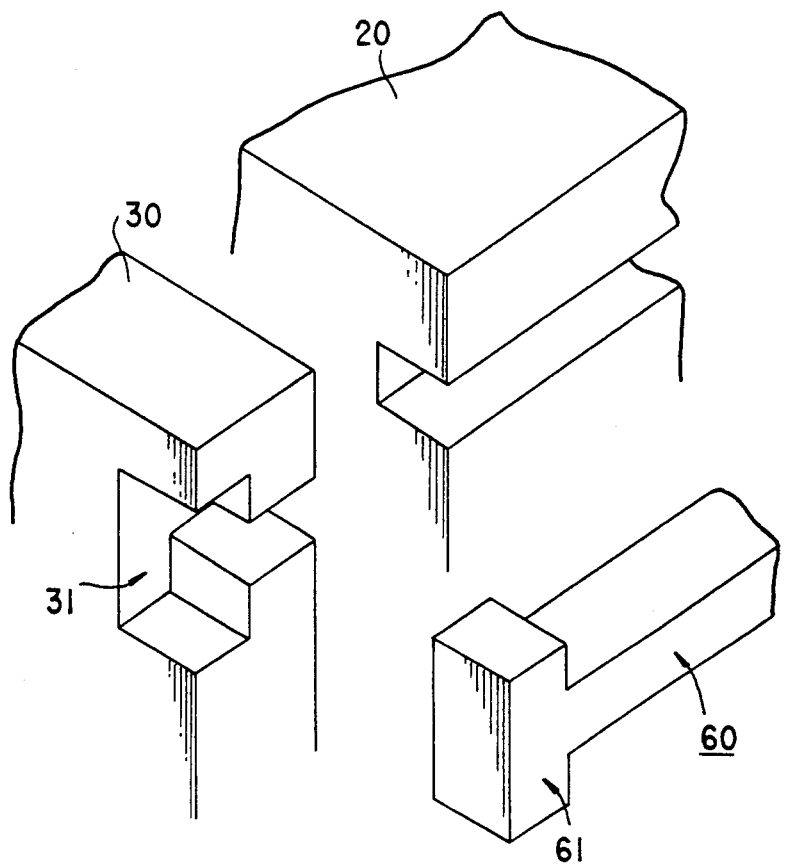
FIG. 4 is an exploded perspective view showing an essential portion of another embodiment of the side cover fixing structure according to the present invention.

FIG. 4 shows another embodiment of the side cover fixing structure according to the present invention. In this embodiment, each connecting plate 60 has a T-shaped hook portions 61 whereas the side cover 30 has its retaining portions 31 recessed to fit the hook portions 61.

According to the present embodiment, the T-shaped hook portions 61 formed at the connecting plate 60 are fixedly fitted in the recesses of the side covers 30 so that the connecting plates 60 can be prevented from coming out.

Figure 5:
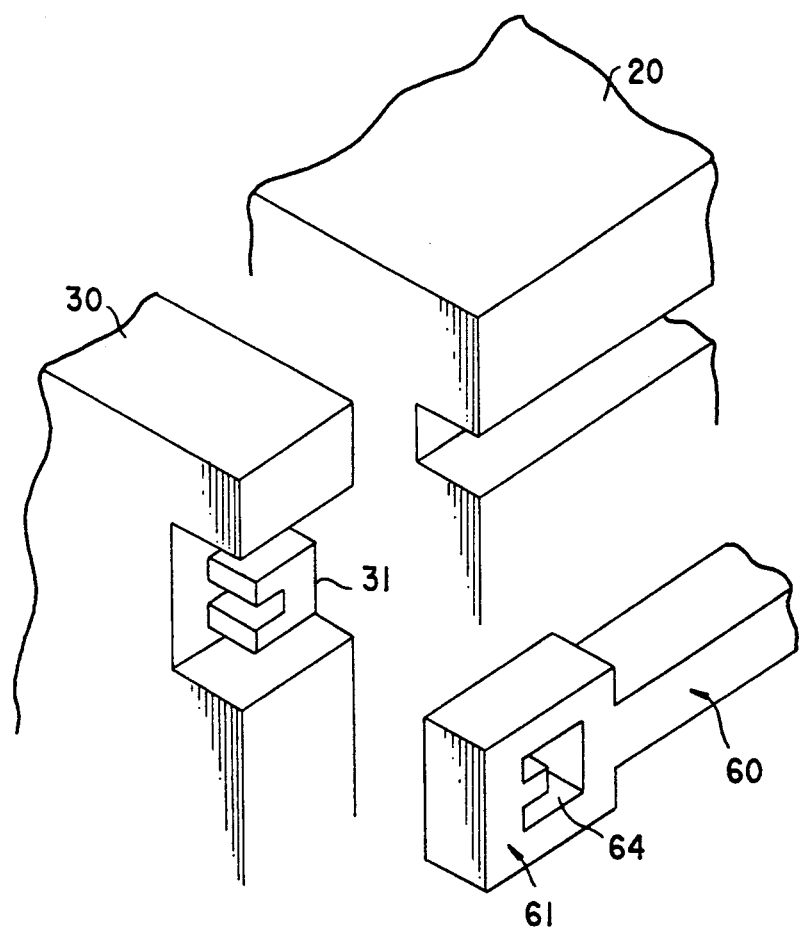
FIG. 5 is an exploded perspective view showing an essential portion of still another embodiment of the side cover fixing structure according to the present invention.

FIG. 5 shows still another embodiment of the side cover fixing structure according to the present invention. In this embodiment, each connecting plate 60 is formed in its hook portions 61 with C-shaped recesses whereas the side cover 30 has its retaining portions 31 formed into projections which are fitted in the recess of the connecting plate 60.

In the present embodiment, the retaining portions 31 and the hook portions 61 are caused to engage in more portions than those of FIG. 4 so that the connecting plates 60 can be firmly fixed in the side covers 30.

The retaining portions 31 of the side covers 30 and the hook portions 61 of the connecting plates 60 should not be limited to those of the foregoing embodiments but could adopt various constructions. Moreover, the numbers and positions of the retaining portions 31 formed at the side covers 30 and the connecting plates 60 can be suitably selected, if necessary.

Next, the method of assembling the side cover fixing structure according to the present invention will be described in the following.

First of all, the paired side covers 30 and 30 are applied to and arranged on the two end faces of the bearing body 20. Next, one hook portion 61 of the first connecting plate 60 is retained by the retaining portion of one side cover 30. After this, the other hook portion 61 of the connecting plate 60 is retained by the retaining portion 31 of the other side cover 30. These operations are accomplished by pushing the other hook portion 61 of the connecting plate 60 strongly in the direction of arrow A, as shown in FIG. 3. Similar operations are carried out for the second connecting plate 60, thus fixing the paired side covers 30 and 30 on the two end faces of the bearing body 20.

INDUSTRIAL APPLICABILITY

As has been described hereinbefore, according to the side cover fixing structure of the present invention, the paired side covers are fixed on the two end faces of the bearing body by using the paired connecting plates so that the linear motion bearing can be advantageously practiced simply and inexpensively even it is small-sized. As a result, it is possible to automate the assembly of the small-sized linear motion bearing and to manufacture a more compact linear motion bearing than that of the prior art.

I claim:

1. A side cover fixing structure for a linear motion bearing, comprising:
    a bearing body;
    a pair of side covers to be fixed in abutment on the two end faces of said bearing body and each having at least two retaining portions; and
    at least two connecting plates of an elastic member each having at its two ends hook portions to be retained by the retaining portions of said side covers, whereby said connecting plates fix said bearing body and said paired side covers integrally by having their two end hook portions retained by the corresponding retaining portions of said side covers.

2. A side cover fixing structure for a linear motion bearing according to claim (1), wherein each of the retaining portions of said side covers is formed of a slope and a deeper recess whereas said connecting plates have their hook portions shaped to mate the retaining portions of said side covers.

3. A side cover fixing structure for a linear motion bearing according to claim (1), wherein said connecting plates have their hook portions formed to have a shape of letter "T" whereas said side covers have their retaining portions are formed with recess for retaining the hook portions of said connecting plates.

4. A side cover fixing structure for a linear motion bearing according to claim (1), wherein said connecting plates have their hook portions formed to have C-shaped recesses whereas said side covers have their retaining portions formed into protrusions to be fitted in the recesses of said connecting plates. j

* * * * *